(12) United States Patent
Nagai et al.

(10) Patent No.: US 6,848,327 B2
(45) Date of Patent: Feb. 1, 2005

(54) ACTUATOR (75) Inventors: Shigekazu Nagai, Adachi-ku (JP); Akio Saitoh, Kawaguchi (JP); Masaru Saitoh, Tsukuba-gun (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/000,349

(22) Filed: Dec. 4, 2001

(65) Prior Publication Data
US 2002/0066327 A1 Jun. 6, 2002

(30) Foreign Application Priority Data
Dec. 5, 2000 (JP) ......................................... 2000-370659

(51) Int. Cl.[7] .............................................. F16H 25/22
(52) U.S. Cl. ...................................... 74/89.33; 74/89.23
(58) Field of Search ............................. 94/89.23, 89.33, 94/89.32; 269/244; 384/45

(56) References Cited

U.S. PATENT DOCUMENTS

| | | | | |
|---|---|---|---|---|
| 5,747,896 A | * | 5/1998 | Nagai et al. | .................. 310/20 |
| 6,240,796 B1 | * | 6/2001 | Yamada | ..................... 74/89.23 |
| 6,446,520 B1 | | 9/2002 | Nagai et al. | |
| 2001/0002783 A1 | | 6/2001 | Kajita et al. | |

FOREIGN PATENT DOCUMENTS

| | | |
|---|---|---|
| DE | 199 03 612 | 8/1999 |
| DE | 198 82 926 | 11/2000 |
| EP | 0 987 468 | 3/2000 |
| JP | 4-138127 | 12/1992 |
| JP | 5-180297 | 7/1993 |
| JP | 5-209619 | 8/1993 |
| JP | 7-28444 | 6/1995 |
| JP | 11-30234 | 2/1999 |
| JP | 11-108141 | 4/1999 |
| JP | 11-201161 | 7/1999 |
| JP | 2000-27968 | 1/2000 |
| JP | 2000-88071 | 3/2000 |
| JP | 2000-213617 | 8/2000 |

OTHER PUBLICATIONS

Copending U.S. Appl. No. 10/108,901 filed Mar. 29, 2002 by Shigekazu Nagai et al.
Copending U.S. Appl. No. 10/449,535 filed Jun. 2, 2003 by Shigekazu Nagai et al.

* cited by examiner

Primary Examiner—William C. Joyce
(74) Attorney, Agent, or Firm—Paul A. Guss (57) ABSTRACT

An actuator comprises a feed screw shaft mechanism including a ball screw shaft and a ball screw nut, and a slider having an opening for receiving the ball screw shaft and the ball screw nut therein. The feed screw shaft mechanism is assembled into a single unit which is detachably installed to a frame by the aid of the opening of the slider.

7 Claims, 13 Drawing Sheets

ACTUATOR

BACKGROUND OF THE INVENTION

1. Field of the Invention

The present invention relates to an actuator which effects linear reciprocating motion of a slider along a frame under a driving action of a driving source.

2. Description of the Related Art

Actuators or the like have been used as transport means for transporting a workpiece.

Figure 12:
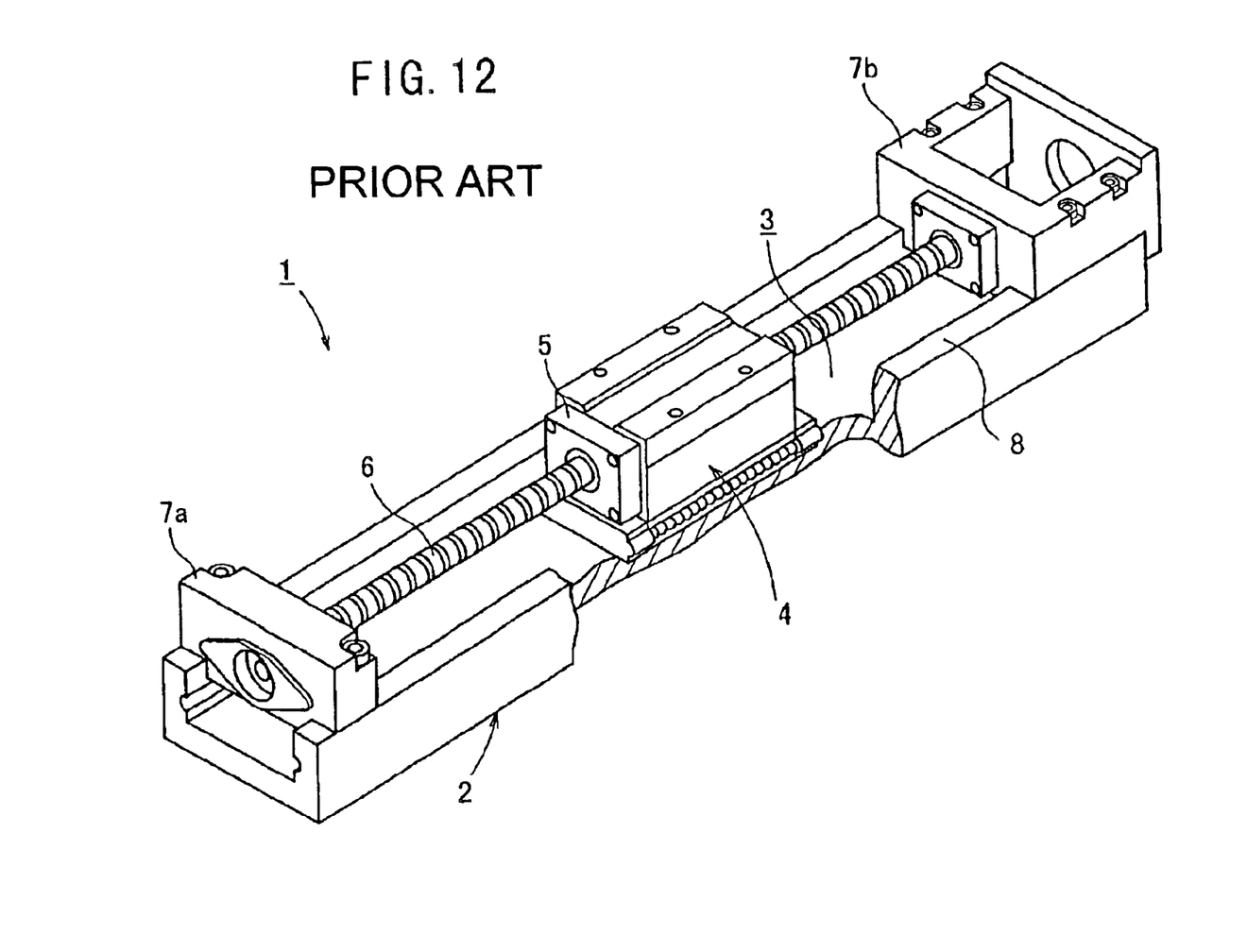
FIG. 12 is a view, with partial cutaway, showing a conventional actuator.
Figure 13:
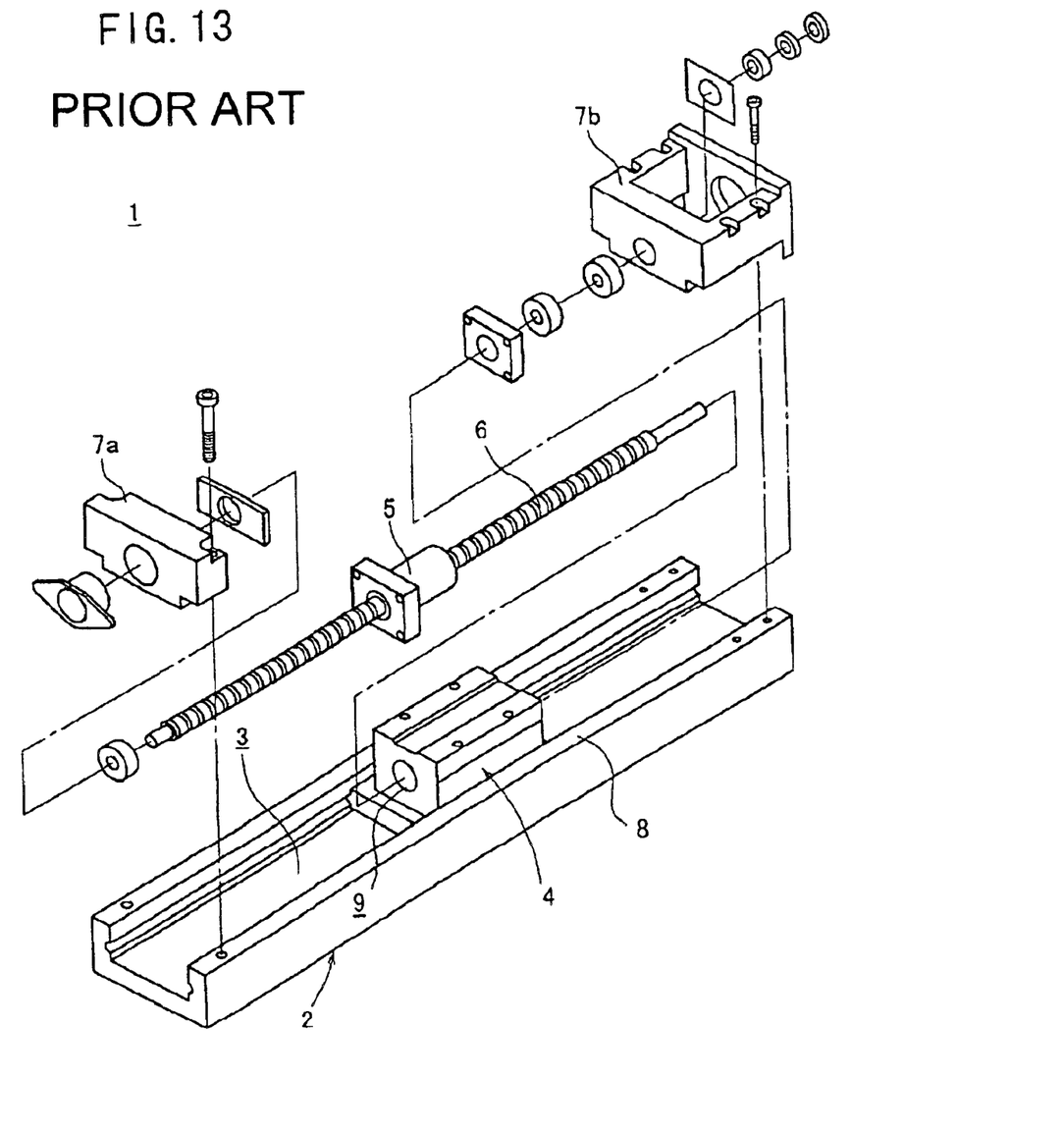
FIG. 13 is an exploded perspective view illustrating the conventional actuator.

An conventional actuator is shown in FIGS. 12 and 13 (see, for example, Japanese Laid-Open Patent Publication No. 11-30234).

The conventional actuator 1 includes a slider 4 which is displaceable along a recess 3 of a track rail 2, and a screw shaft 6 which is driven by an unillustrated driving motor and which is screw-engaged with a nut member 5 that is detachable with respect to the slider 4. A pair of screw shaft support members 7a, 7b, which rotatably support the screw shaft 6, are provided at both ends of the screw shaft 6 respectively. The screw shaft support members 7a, 7b are attached to an upper surface 8 of the track rail 2.

However, in the conventional actuator 1, it is not possible to provide the feed screw shaft mechanism as a single assembling unit including the screw shaft 6 and the screw shaft support members 7a, 7b. Therefore, it is not possible to conveniently assemble the feed screw shaft mechanism to the track rail 2 and disassemble the feed screw shaft mechanism from the track rail 2.

Specifically, in the conventional actuator 1, it is necessary to insert the screw shaft 6 through a through-hole 9 of the slider 4 as shown in FIG. 13. Since the slider 4 acts as an obstructive member, it is impossible to provide the feed screw shaft mechanism as a single unit including, for example, the screw shaft 6 and the screw shaft support members 7a, 7b.

When the screw shaft 6 is assembled to the track rail 2, it is necessary to insert the screw shaft 6 through the through-hole 9 of the slider 4. When the screw shaft 6 is detached from the track rail 2, it is necessary to pull out the screw shaft 6 from an axial end of the track rail 2 to disengage the screw shaft 6 from the through-hole 9 of the slider 4. In such a procedure, when the track rail 2 is fixed, and there is an obstacle at the axial end of the track rail 2, it is difficult to pull out the screw shaft 6 from the through-hole 9 of the slider 4.

SUMMARY OF THE INVENTION

A general object of the present invention is to provide an actuator in which the feed screw shaft mechanism is provided as a single unit so that the feed screw shaft mechanism can be assembled to a frame easily and conveniently, and the feed screw shaft mechanism can be disassembled from the frame easily and conveniently.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
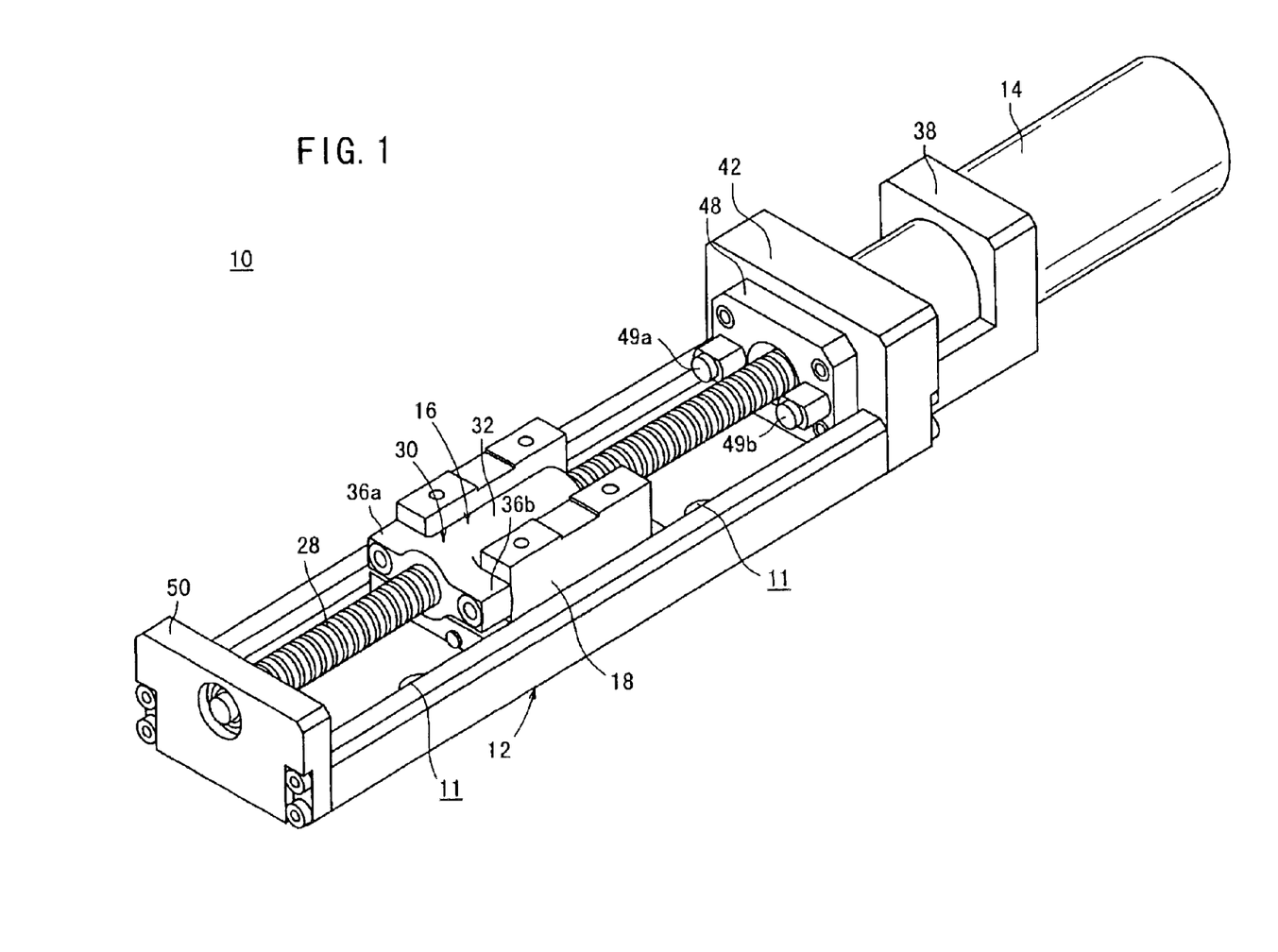
FIG. 1 is a perspective view illustrating an actuator according to an embodiment of the present invention.
Figure 2:
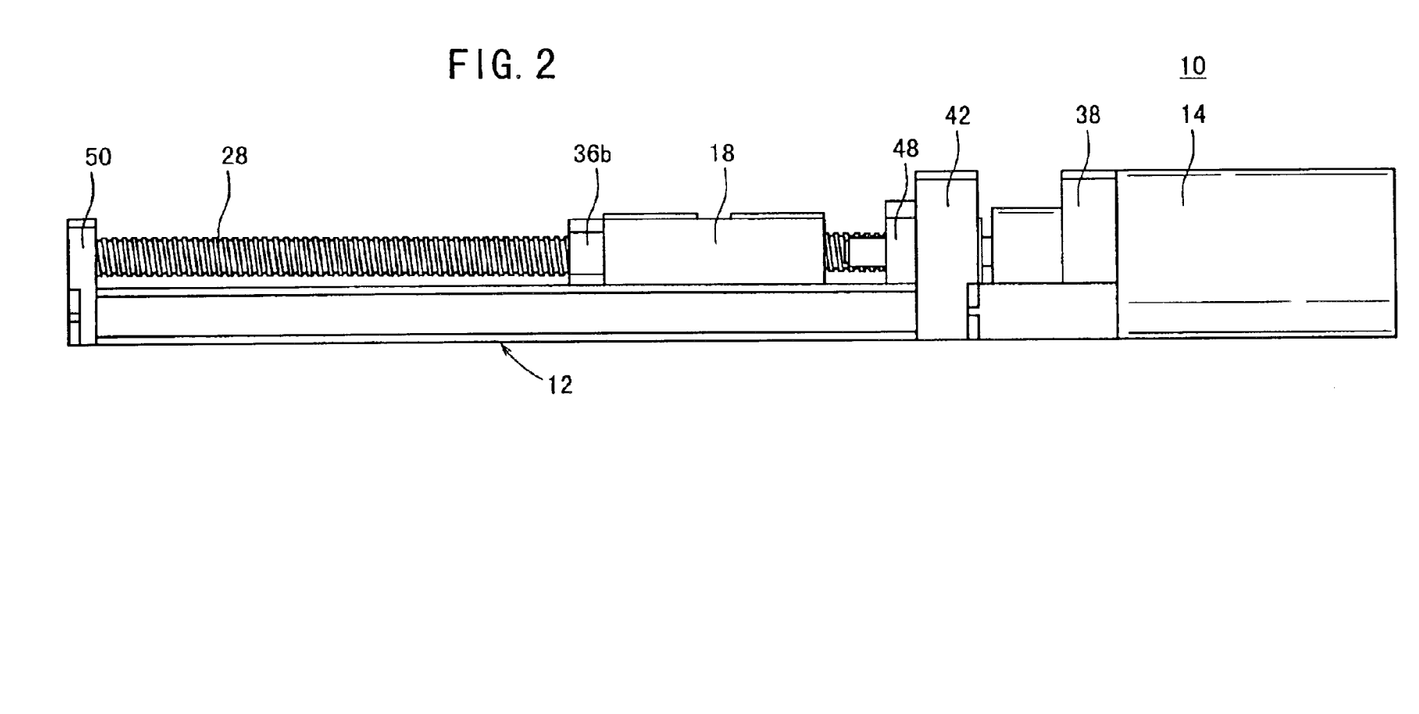
FIG. 2 is a front view illustrating the actuator.
Figure 3:
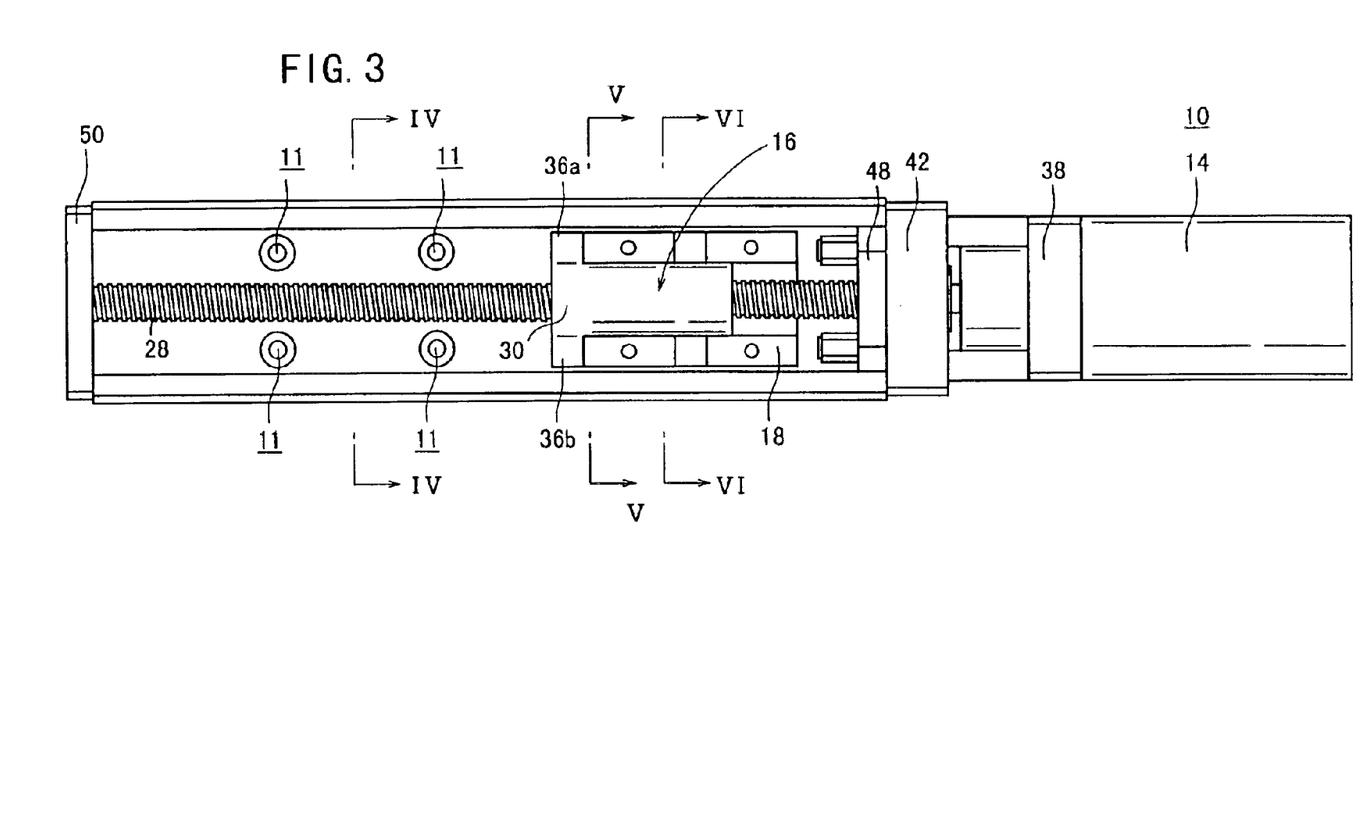
FIG. 3 is a plan view illustrating the actuator.
Figure 4:
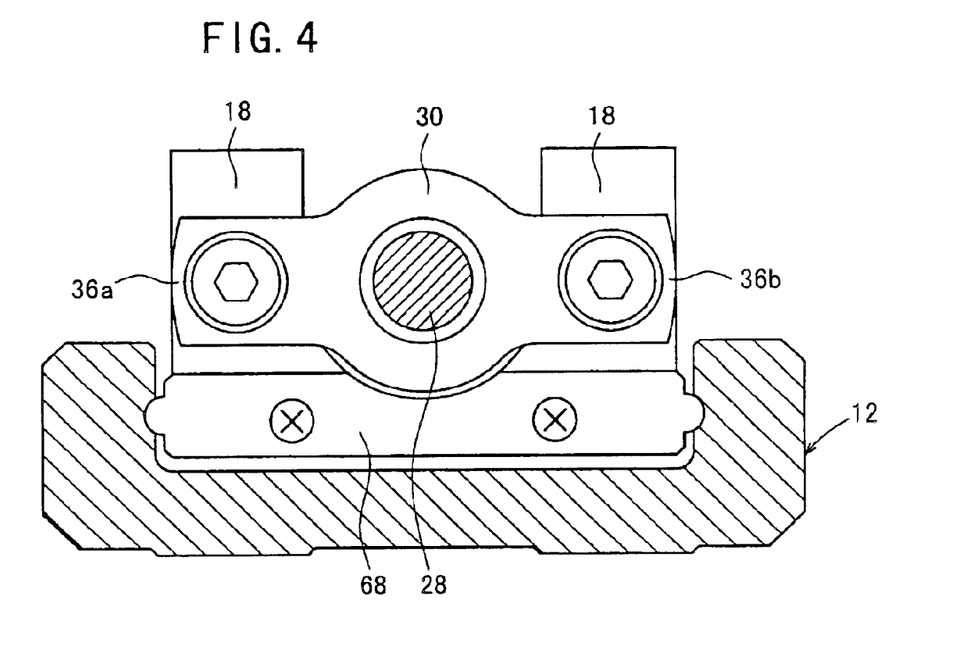
FIG. 4 is a vertical sectional view taken along a line IV—IV shown in FIG. 3.

In FIG. 1, reference numeral 10 indicates an actuator according to an embodiment of the present invention.

The actuator 10 comprises a frame 12 having a plurality of attachment holes 11, a rotary driving source 14 connected to an end of the frame 12, a feed screw shaft mechanism 16 which is detachably assembled to the frame 12 for transmitting a rotary driving force of the rotary driving source 14 through an unillustrated coupling member, a slider 18 which reciprocates in the axial direction of the frame 12 under the action of the driving force transmitted by the feed screw shaft mechanism 16, and a guide mechanism 20 (see FIG. 10) for guiding the slider 18 along the frame 12.

It is preferable that each of the frame 12 and the slider 18 is formed of a metal material such as stainless steel.

Figure 7:
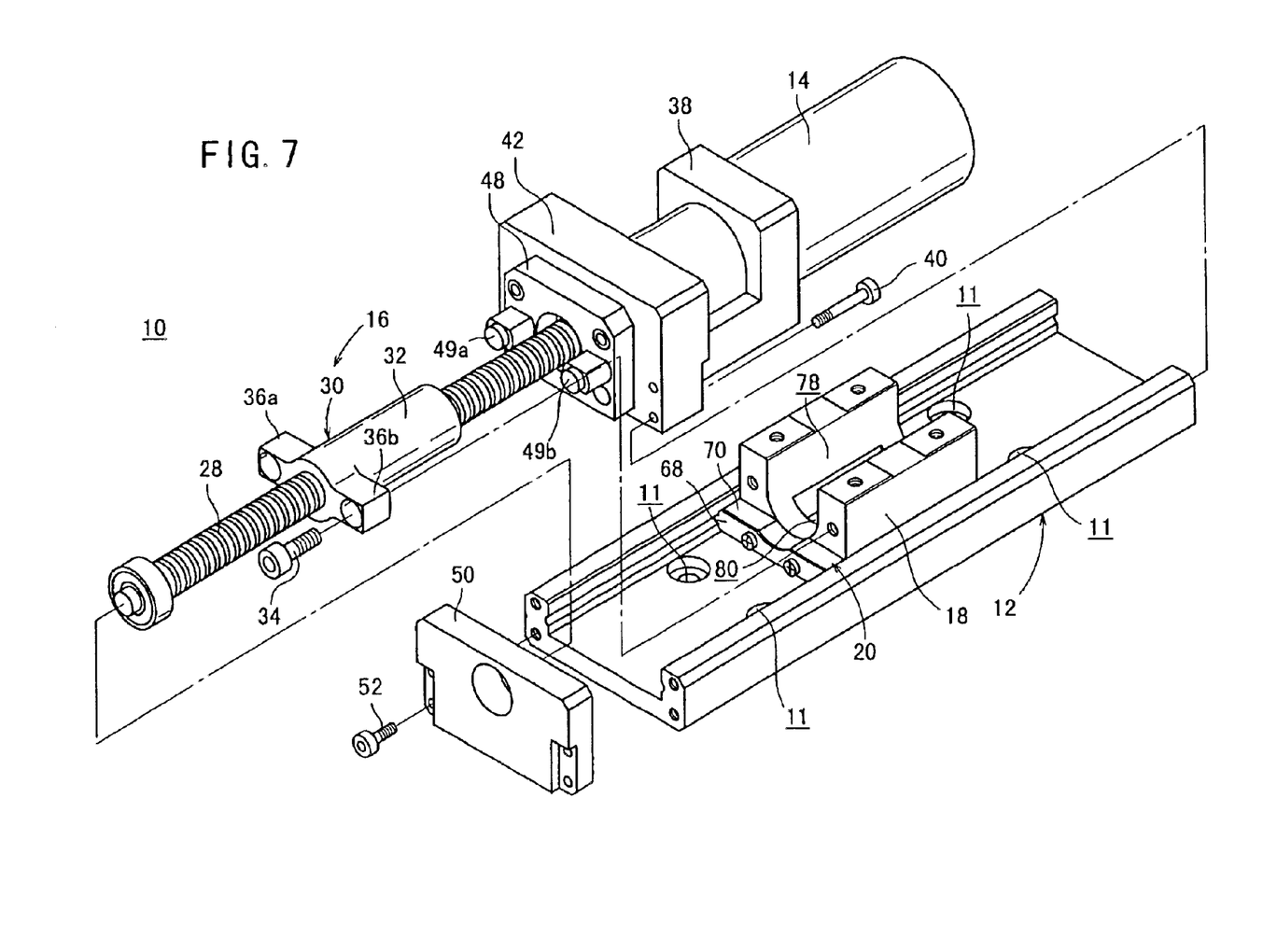
FIG. 7 is an exploded perspective view illustrating major components of the actuator.
Figure 8:
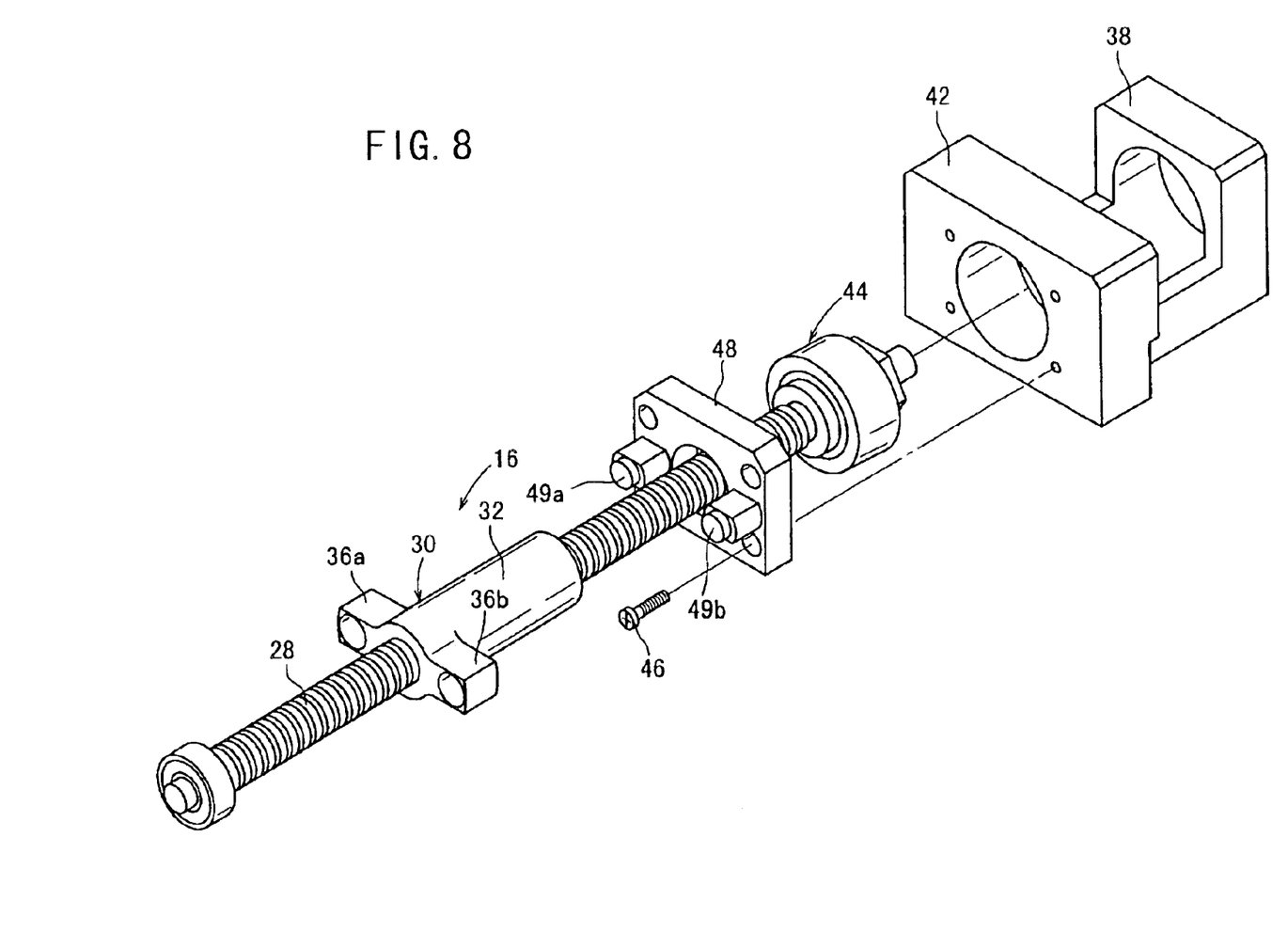
FIG. 8 is an exploded perspective view illustrating a feed screw shaft mechanism of the actuator.

As shown in FIGS. 7 and 8, the feed screw shaft mechanism 16 includes a ball screw shaft (feed screw shaft) 28 which is connected coaxially to the drive shaft of the rotary driving source 14 with the unillustrated coupling member, and a ball screw nut (feed screw nut) 30 having a penetrating screw hole for receiving the ball screw shaft 28.

The ball screw nut 30 comprises a cylindrical section 32 having the penetrating screw hole, and a pair of flange sections 36a, 36b which are formed integrally at one end of the cylindrical section 32 and which are fixed to side surface portions of the slider 18 with screw members 34.

The feed screw shaft mechanism 16 includes a housing 42 which has a support section 38 for supporting the rotary driving source 14 and which is connected to one end of the frame 12 with screw members 40, a bearing mechanism 44 which is connected to the end of the ball screw shaft 28, and a bearing holding member 48 which is connected to the housing 42 with screw members 46. The bearing holding member 48 is provided with a pair of dampers 49a, 49b which are separated from each other by a predetermined spacing distance in a substantially horizontal direction so that the dampers 49a, 49b protrude toward the slider 18.

Figure 9:
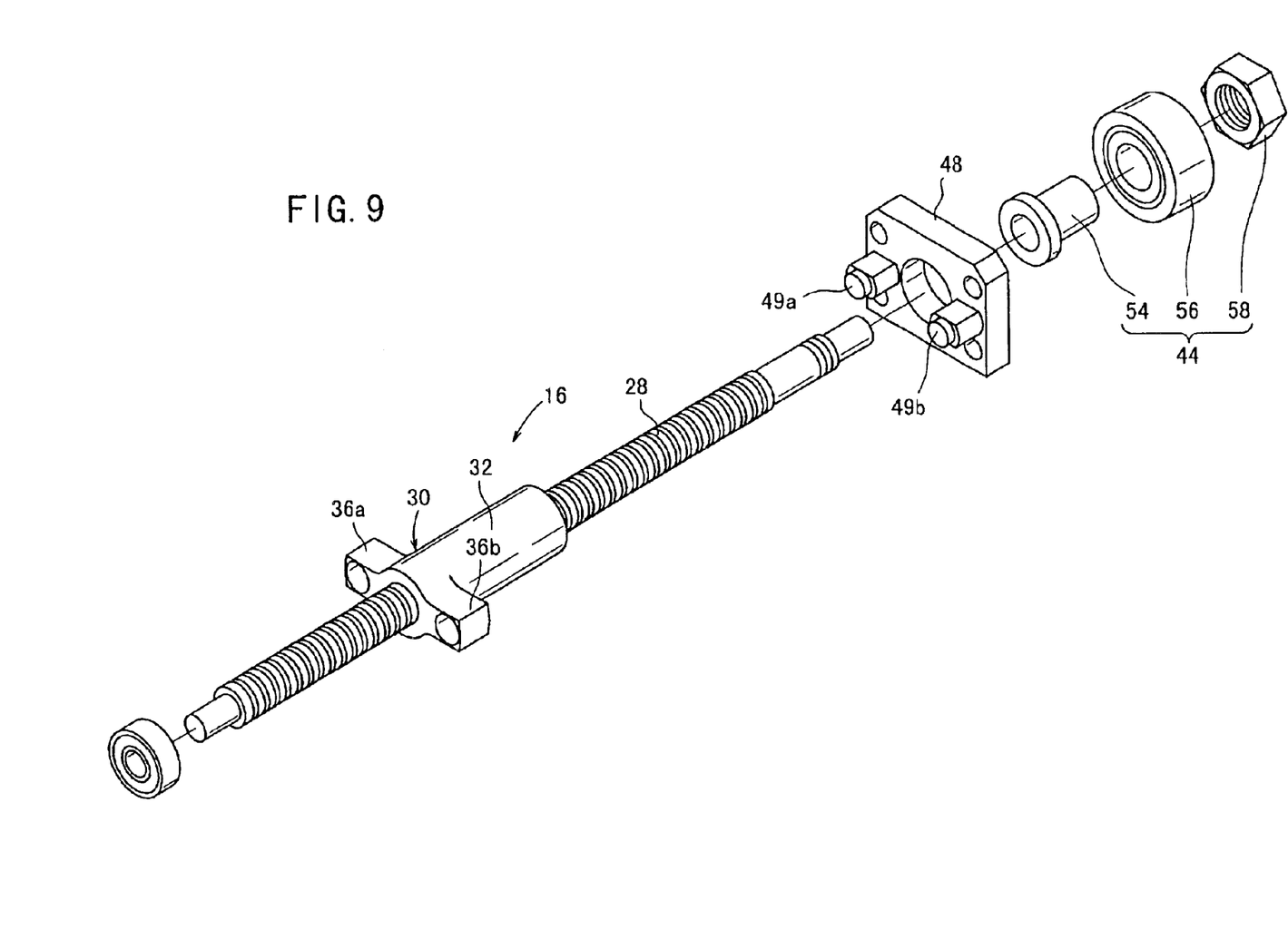
FIG. 9 is an exploded perspective view illustrating parts of the feed screw shaft mechanism.

An end plate 50 for rotatably supporting the other end of the ball screw shaft 28 is installed at the other axial end of the frame 12 with screw members 52. As shown in FIG. 9, the bearing mechanism 44 includes a spacer 54, a bearing 56, and a lock nut 58.

In this arrangement, as shown in FIG. 9, it is preferable to provide the feed screw shaft mechanism 16 as a single unit, i.e., to assemble the ball screw shaft 28, the ball screw nut 30, the bearing holding member 48, and the bearing mechanism 44 into one piece.

Alternatively, as shown in FIG. 8, the feed screw shaft mechanism 16 may be constructed as a single unit including the housing 42 in addition to the ball screw shaft 28, the ball screw nut 30, the bearing holding member 48, and the bearing mechanism 44.

Further, the feed screw shaft mechanism may be constructed as a single unit including the end plate 50 in addition to the ball screw shaft 28, the ball screw nut 30, the bearing holding member 48, the bearing mechanism 44, and the housing 42 (see FIG. 7).

Figure 10:
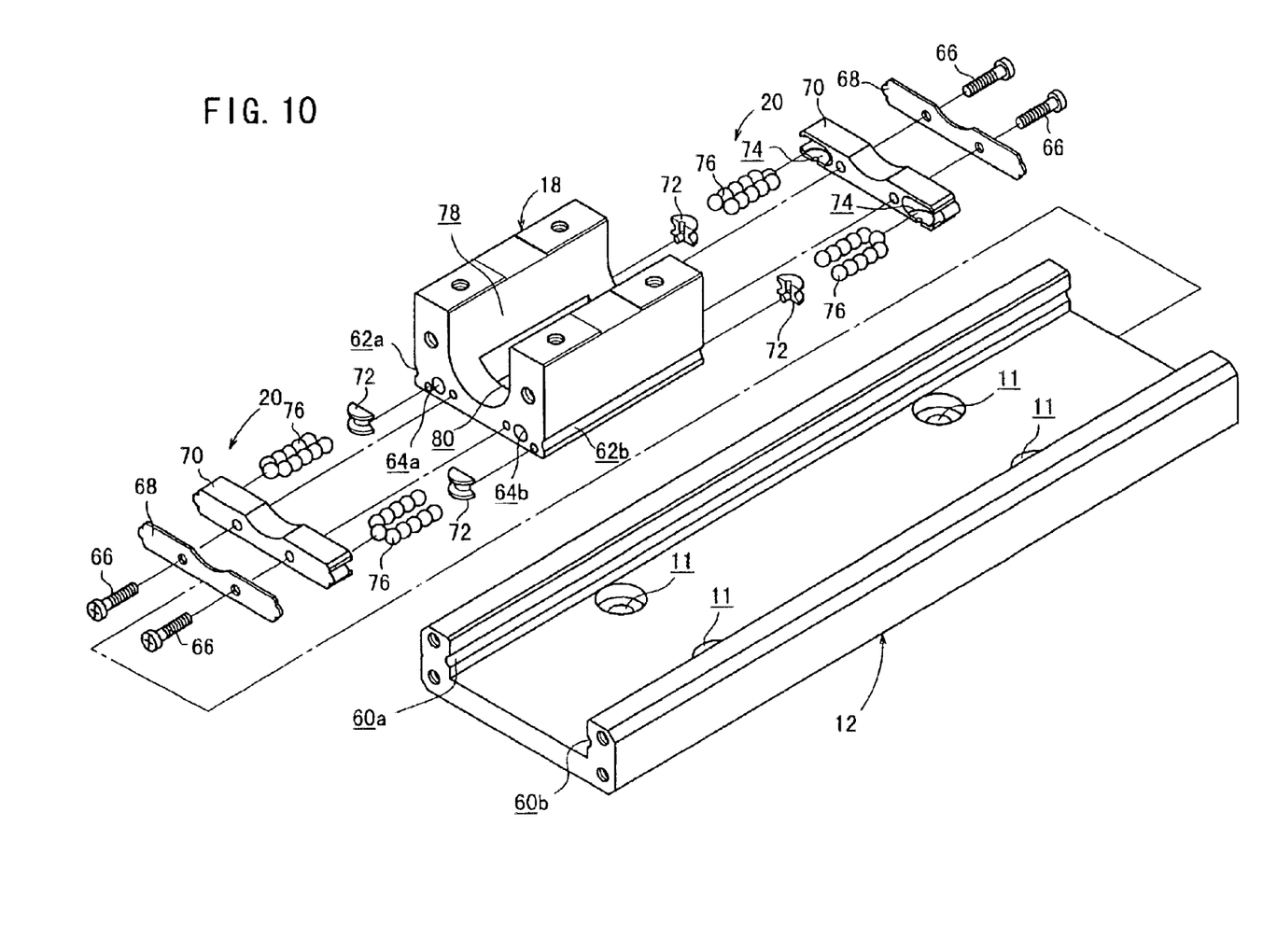
FIG. 10 is an exploded perspective view illustrating a guide mechanism of the actuator.

As shown in FIG. 10, the guide mechanism 20 includes a pair of first ball-rolling grooves 60a, 60b having an arc-shaped cross section, a pair of second ball-rolling grooves 62a, 62b having an arc-shaped cross section, and a pair of ball-rolling holes 64a, 64b. The first ball-rolling grooves 60a, 60b extends in the axial direction of the frame 12 in the vicinity of the bottom surface of the inner wall of the frame 12. The second ball-rolling grooves 62a, 62b are formed on side surfaces of the slider 18. The ball-rolling holes 64a, 64b penetrate the slider 18 in the axial direction, and extend in the vicinity of the second ball-rolling grooves 62a, 62b.

The guide mechanism 20 further includes plates 68 and covers 70 which are integrally connected to lower portions of the slider 18 by with screw members 66 so that they are substantially parallel to the flange sections 36a, 36b of the ball screw nut 30, and return guides 72 which are installed to side surfaces of the slider 18. It is preferable that each of the plate 68, the cover 70, and the return guide 72 is formed of a resin material.

In this arrangement, the plate 68 and the cover 70 are installed to the lower portion of the side surface of the slider 18. Accordingly, an upper portion of the side surface of the slider 18, to which the plate 68 and the cover 70 are not installed, can be used as an abutment surface for making abutment against the dampers 49a, 49b.

The plate 68, the cover 70, and the return guide 72, which are disposed on one side of the slider 18 in the axial direction, are constructed by the same constitutive components as those which are disposed on the other side.

Ball return grooves 74 are formed for the cover 70. In this arrangement, endless circulating tracks, along which a plurality of balls 76 roll, are constructed by the mutually opposing first and second ball-rolling grooves 60a, 60b, 62a, 62b, the penetrating ball-rolling holes 64a, 64b formed for the slider 18, and the ball return grooves 74.

As shown in FIG. 7, an opening 78, i.e., upwardly opening large recess, is formed at an upper central portion of the slider 18. The opening 78 extends in the axial direction of the slider 18, and defines a U-shaped inner surface of the slider 18. Accordingly, the cylindrical section 32 of the ball screw nut 30 can be assembled from the position thereover.

Figure 6:
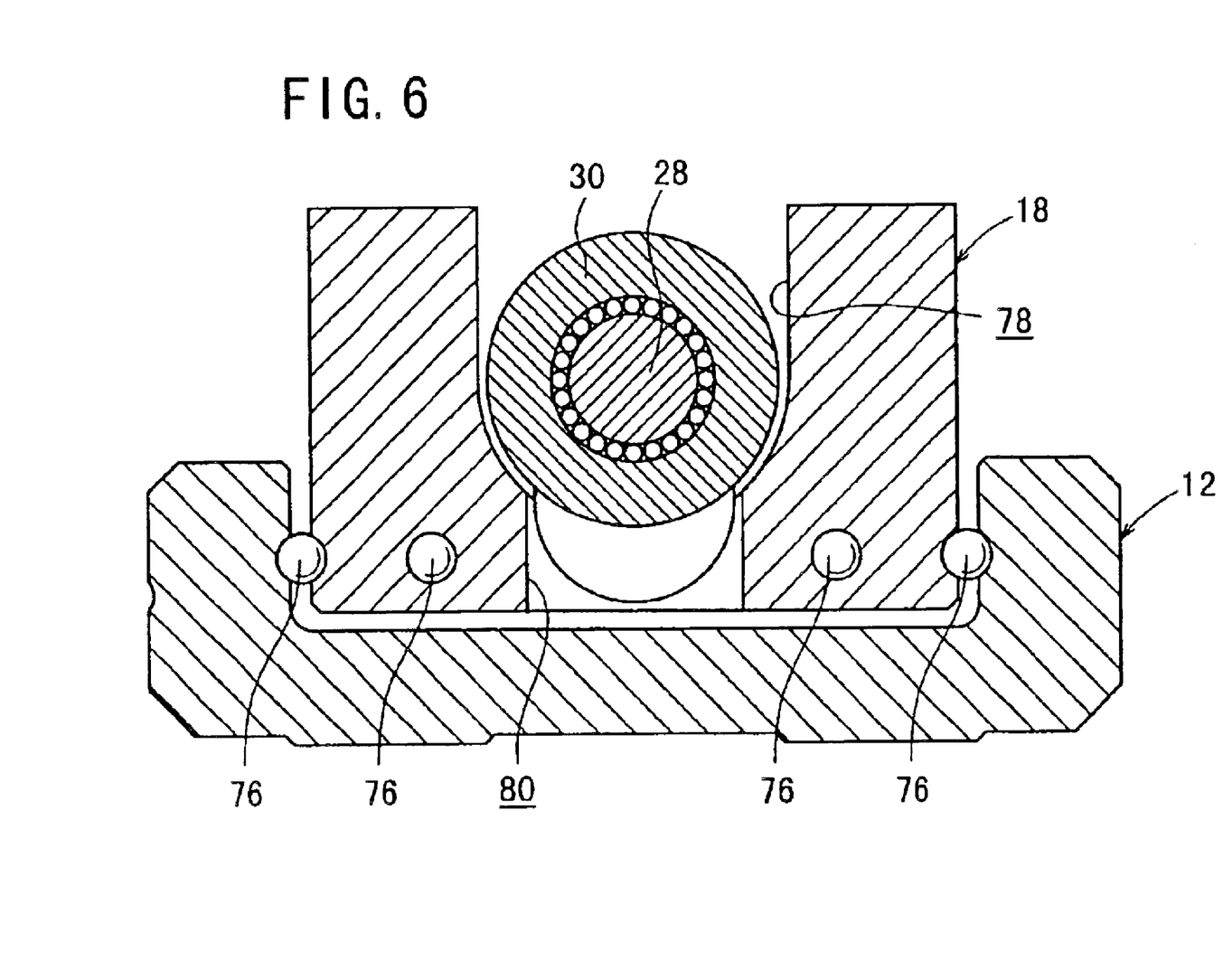
FIG. 6 is a vertical sectional view taken along a line VI—VI shown in FIG. 3.

As shown in FIG. 6, a hole 80 having a rectangular cross section, which penetrates downwardly from the opening 78, is formed through the slider 18. A return tube (not shown), which is installed to the ball screw nut 30 and which functions as a passage for allowing the plurality of balls 76 to roll, is accommodated in the hole 80. Therefore, with the hole 80 for accommodating the return tube, it is possible to reduce the size or dimension of the slider 18 in the height direction.

The actuator 10 according to the embodiment of the present invention is basically constructed as described above. Next, its operation, function, and effect will be explained.

At first, explanation will be made for a method for assembling the actuator 10.

The pair of plates 68 and the covers 70 are installed to the both end surfaces of the slider 18 with the screw members 66. The slider 18 is assembled into the recess of the frame 12 (see FIG. 10). In this arrangement, the plates 68, the covers 70, and return guides 72, which are composed of the same constitutive components respectively, are installed to the opposite ends the slider 18. Therefore, the plate 68, the cover 70, and the other components can be installed from either side of the slider 18.

In other words, the same constitutive members are used for both ends of the slider 18 in the axial direction, and thus the assembling operation can be performed easily and conveniently regardless of the assembling orientation of these members. Further, since common parts are used for the guide mechanism 20, the number of parts can be reduced, and thus, the production cost is reduced.

Subsequently, as shown in FIG. 7, the cylindrical section 32 of the ball screw nut 30 is inserted along the opening 78 from a position over the slider 18. The flange sections 36a, 36b are fastened to the side surface of the slider 18 with the screw members 34. Further, the feed screw shaft mechanism 16, i.e., the single assembly unit including the ball screw shaft 28, the ball screw nut 30, the end plate 50, and the housing 42 is installed to the frame 12.

In this arrangement, the slider 18 is not obstructive for installing the screw shaft mechanism 16 to the frame 12 thanks to the opening 78 defining the U-shaped upper inner surface of the slider 18. The unit of the feed screw shaft mechanism 16, in which the ball screw shaft 28, the ball screw nut 30, the end plate 50, and the housing 42 are assembled in an integrated manner, can be installed easily and conveniently to the frame 12 from the position over the slider 18. The unit of the feed screw shaft mechanism 16 can be disengaged easily and conveniently from the frame 12 from the opening 78 of the slider 18.

Figure 5:
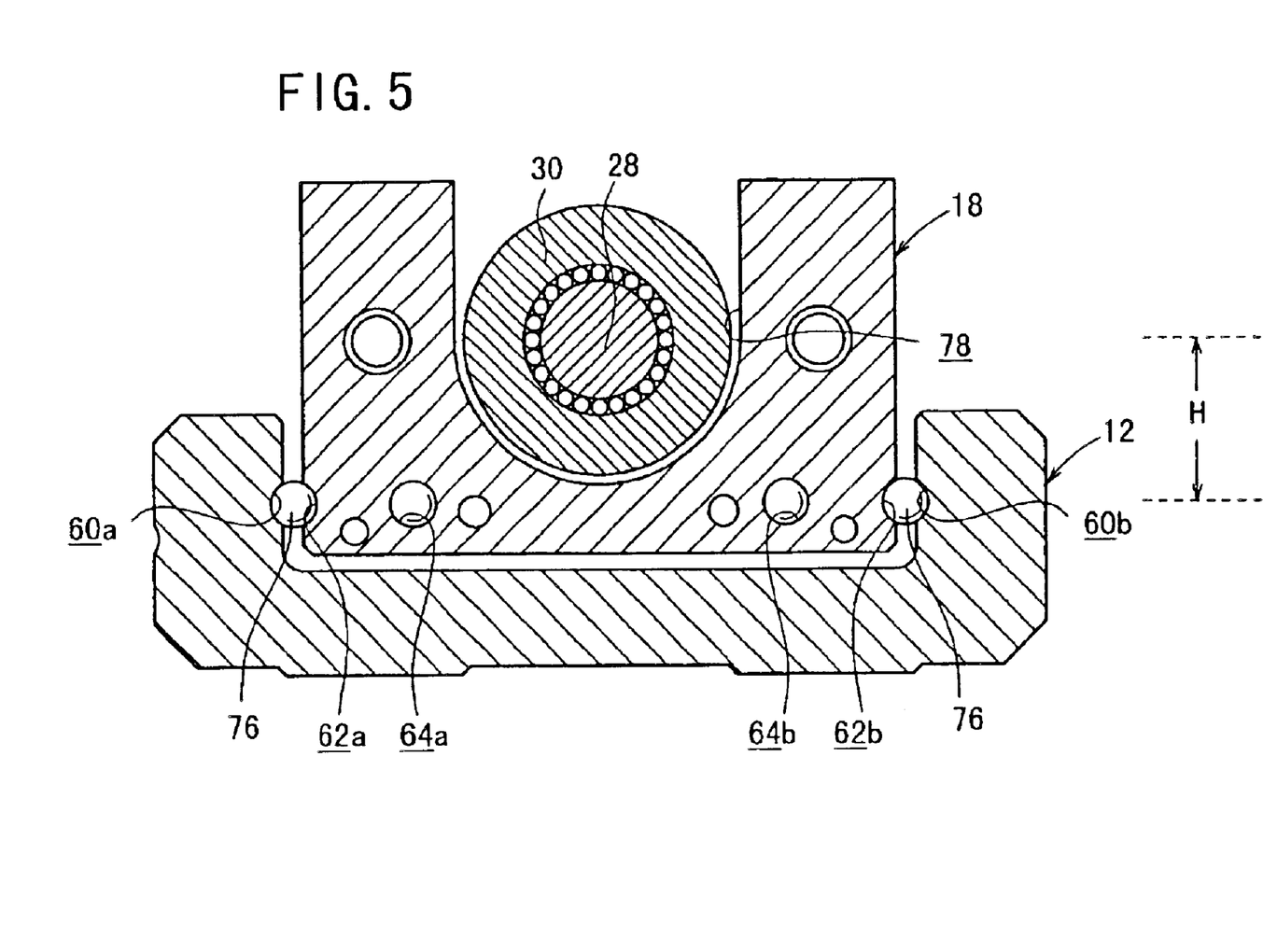
FIG. 5 is a vertical sectional view taken along a line V—V shown in FIG. 3.

In the embodiment of the present invention, as shown in FIG. 5, the distance of separation H is small between the substantially horizontal straight line for connecting the centers of the balls 76 rolling along the endless circulating track and the substantially horizontal straight line passing through the center of the ball screw shaft 28. Therefore, the moment applied to the slider 18 is suppressed, and it is possible to reliably effect the stable reciprocating linear motion of the slider 18.

Next, the operation of the actuator 10 will be explained.

When an unillustrated power source is energized, the rotary driving force of the rotary driving source 14 is transmitted to the ball screw shaft 28. Owing to the engagement of the ball screw shaft 28 rotating in the predetermined direction with respect to the screw hole of the ball screw nut 30, the slider 18, which is connected to the ball screw nut 30, is displaced in the axial direction of the frame 12 under the guiding action of the guide mechanism 20. When the positive or negative polarity of the current flowing through the rotary driving source 14 is inverted under the control action of an unillustrated controller, the slider 18 reciprocates in the axial direction of the frame 12.

When the slider 18 reciprocates in the axial direction of the frame 12, the plurality of balls 76 roll along the first ball-rolling grooves 60a, 60b and the second ball-rolling grooves 62, 62b.

In the embodiment of the present invention, the ball screw shaft 28 and the rotary driving shaft of the rotary driving source 14 are coaxially connected to one another. However, the ball screw shaft 28 and the rotary driving source 14 may be arranged substantially in parallel by using an unillustrated timing belt wound over a first pulley (not shown) connected to the ball screw shaft 28 and a second pulley (not shown) connected to the rotary driving shaft respectively.

Alternatively, unillustrated driving means including, for example, a rodless cylinder or a fluid pressure-operated cylinder may be used in place of the rotary driving source 14.

Figure 11:
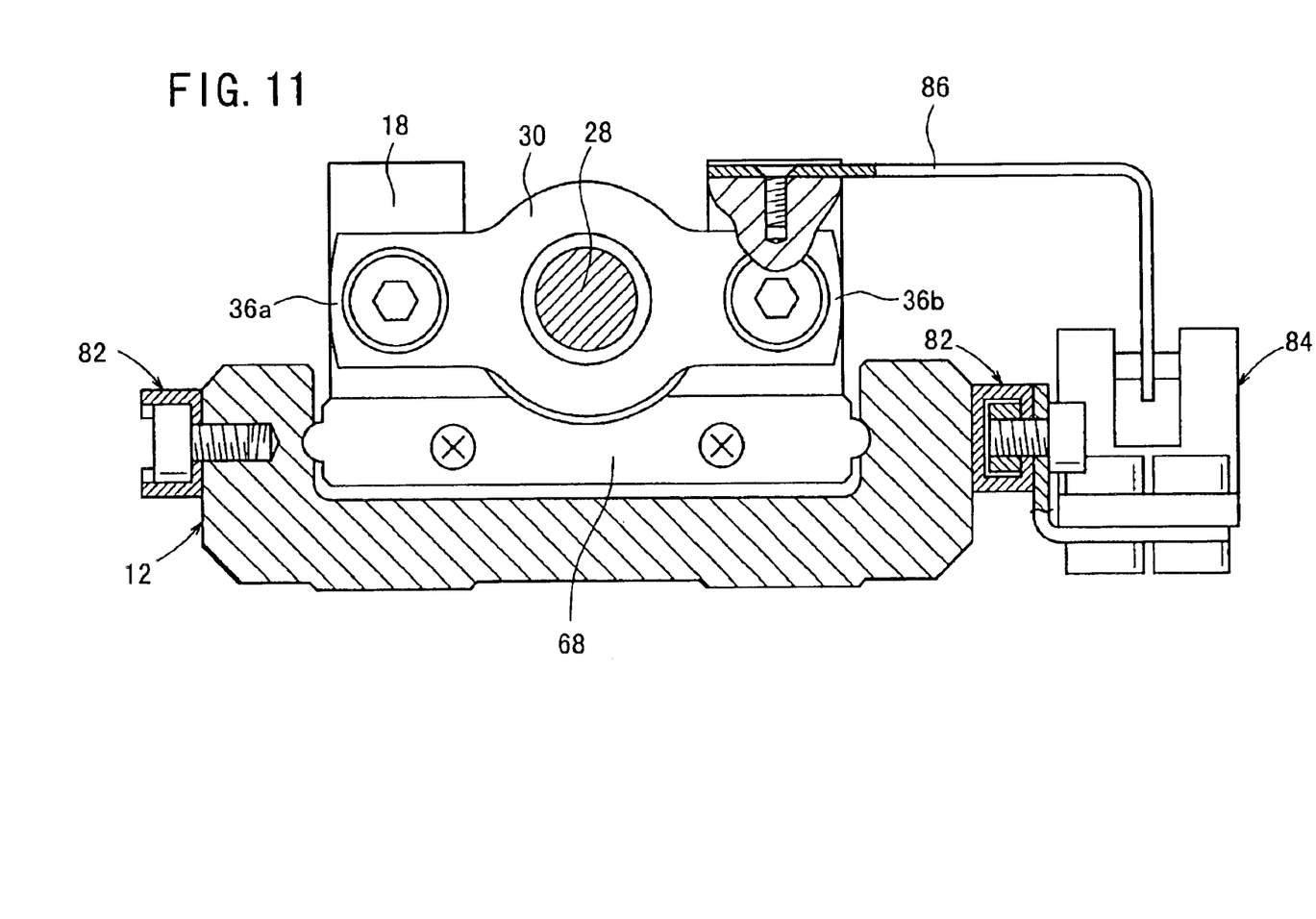
FIG. 11 is a partial vertical sectional view illustrating a state in which a sensor is installed to a side surface of a frame.

Further, as shown in FIG. 11, a photosensor 84 may be installed to a side of the frame 12 with an attachment member 82 to detect an L-shaped object 86 which is connected to the slider 18 and which is displaceable in unison with the slider 18. Accordingly, it is possible to detect the position of an initial position.

Additionally, in the embodiment of the present invention, the two arrays of the ball-rolling grooves 60a, 60b of the frame 12 are arranged substantially horizontally, which is advantageous in that the dimension of the side portion of the frame 12 can be reduced, while increasing rigidity, as compared with a case in which four arrays are arranged.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. An actuator comprising:
    a frame;
    a driving source for generating a driving force;
    a feed screw shaft mechanism for transmitting said driving force of said driving source, said feed screw shaft mechanism being assembled into a single unit including a feed screw shaft and a feed screw nut and detachably installed to said frame;
    a slider having an opening for receiving said feed screw shaft and said feed screw nut therein, said slider being capable of reciprocating in an axial direction of said frame under an action of said driving force transmitted by said feed screw shaft mechanism; and
    a guide mechanism for guiding said slider when said slider is displaced along said frame, wherein said guide mechanism includes plates and covers which are connected to and move together with said slider, and ball return guides which are installed to side surfaces of said slider and accommodated within said covers,
    wherein said opening extends in said axial direction, and includes a rounded inner surface having an upwardly oriented U-shaped cross-section, and said slider has a hole which penetrates downwardly from said opening to said frame, and
    wherein said feed screw nut, which is received in said opening, is a ball screw nut having a cylindrical section having a penetrating screw hole, and a pair of flange sections which are formed integrally at one end of said cylindrical section and which are fixed to a side surface portion of said slider, such that said cylindrical section is insertable into and removable from said slider through said opening from an upper side of said slider when said slider is accommodated in said frame.

2. The actuator according to claim 1, wherein said driving source is a rotary driving source, said feed screw shaft is rotatable in a predetermined direction under a driving action of said rotary driving source, and said feed screw nut has a penetrating screw hole for receiving said feed screw shaft,
    said single unit including said feed screw shaft, said feed screw nut, a bearing holding member, and a bearing mechanism.

3. The actuator according to claim 1, wherein said driving source is a rotary driving source, said feed screw shaft in rotatable in a predetermined direction under a driving action of said rotary driving source, and said feed screw nut has a penetrating screw hole for receiving said feed screw shaft,
    said single unit including said feed screw shaft, said feed screw nut, a bearing holding member, a bearing mechanism, and a housing for supporting said rotary driving source.

4. The actuator according to claim 1, wherein said driving source is a rotary driving source, said feed screw shaft is rotatable in a predetermined direction under a driving action of said rotary driving source, and said feed screw nut has a penetrating screw hole for receiving said feed screw shaft,
    said single unit including said feed screw shaft, said feed screw nut, a bearing holding member, a bearing mechanism, a housing for supporting said rotary driving source, and an end plate.

5. The actuator according to claim 1, wherein those of said plates, said covers, and said ball return guides which are disposed on one side in an axial direction of said slider are composed of the same constitutive components as those of said plates, said covers, and said ball return guides which are disposed on another side in said axial direction of said slider.

6. The actuator according to claim 1, wherein said hole has a rectangular cross section.

7. The actuator according to claim 1, wherein a sensor is attached to one side surface on an outer side of said frame with an attachment member, and said sensor detects an object which is displaceable in unison with said slider.

* * * * *